United States Patent
Park et al.

(10) Patent No.: US 8,830,036 B2
(45) Date of Patent: Sep. 9, 2014

(54) METHOD AND APPARATUS FOR TRANSMITTING POWER AND DATA

(75) Inventors: Chang Soon Park, Chungju Si (KR); Chan Soo Hwang, Yongin Si (KR); Ki Ho Kim, Seoul (KR); Jong Ae Park, Yongin Si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 820 days.

(21) Appl. No.: 13/024,664

(22) Filed: Feb. 10, 2011

(65) Prior Publication Data

US 2011/0279244 A1 Nov. 17, 2011

(30) Foreign Application Priority Data

May 14, 2010 (KR) ........................ 10-2010-0045287

(51) Int. Cl.
*H02J 7/00* (2006.01)
*H04M 1/725* (2006.01)

(52) U.S. Cl.
CPC ............ *H02J 7/0052* (2013.01); *H04M 1/7253* (2013.01)
USPC ........................................ 340/10.34; 320/108

(58) Field of Classification Search
USPC .................... 340/10.34; 320/108; 455/343.1
See application file for complete search history.

(56) References Cited

U.S. PATENT DOCUMENTS

| | | | | |
|---|---|---|---|---|
| 2008/0014897 A1* | 1/2008 | Cook et al. | ................. | 455/343.1 |
| 2009/0108805 A1* | 4/2009 | Liu et al. | ....................... | 320/108 |
| 2009/0140691 A1* | 6/2009 | Jung | ............................. | 320/108 |
| 2010/0320961 A1* | 12/2010 | Castillo et al. | ................ | 320/107 |
| 2011/0043163 A1* | 2/2011 | Baarman | ....................... | 320/108 |

FOREIGN PATENT DOCUMENTS

| | | |
|---|---|---|
| JP | 2003-152612 | 5/2003 |
| JP | 2005-086262 | 3/2005 |
| JP | 2008-283804 | 11/2008 |
| KR | 1020050051099 | 6/2005 |
| KR | 1020070012122 | 1/2007 |
| KR | 1020070119132 | 12/2007 |
| KR | 1020090012542 | 2/2009 |
| WO | WO 2009/059529 A1 | 5/2009 |

OTHER PUBLICATIONS

Audre Kurs, et al., "Wireless power transfer via strongly coupled magnetic resonances," Science, vol. 317, Jul. 6, 2007, pp. 83-86.
Chinese Office Action issued Jul. 3, 2014 in counterpart Chinese Patent Application No. 201110086276.2 (18 pages, in Chinese with English Translation).

* cited by examiner

*Primary Examiner* — Edwin Holloway, III
(74) *Attorney, Agent, or Firm* — NSIP Law

(57) ABSTRACT

Provided is an apparatus and a method for transmitting power to electronic devices and of transmitting and receiving data. The method of transmitting power includes searching for a device to be charged located in an area, determining whether the found device needs charging, and transmitting power to the found device when the found device is determined to need charging. The apparatus may be mobile, and may travel towards or away from one or more devices based on whether the one or more devices need charging.

29 Claims, 12 Drawing Sheets

METHOD AND APPARATUS FOR TRANSMITTING POWER AND DATA

CROSS-REFERENCE TO RELATED APPLICATION(S)

This application claims the benefit under 35 U.S.C. §119(a) of Korean Patent Application No. 10-2010-0045287, filed on May 14, 2010, in the Korean Intellectual Property Office, the entire disclosure of which is incorporated herein by reference for all purposes.

BACKGROUND

1. Field

The following description relates to an apparatus and a method for transmitting power to electronic devices and for transmitting and receiving data.

2. Description of Related Art

Currently, wireless communications, such as mobile phones, and portable electronic devices, such notebooks, digital cameras, digital media frames, MP3 players, and personal digital assistants (PDA), are widely in use. These portable electronic devices are powered by electricity. Generally, the portable electronic devices are provided with electricity via disposable or rechargeable batteries. As functions and capabilities of the portable electronic devices have become further diversified and improved, the amount of power necessary to drive the devices and a demand for batteries with more power has increased.

The development of battery technologies such as lithium ion batteries has not kept pace with the demand on batteries for more power. For example, existing batteries may not be used for a desired time, and the batteries must be repeatedly charged. There are also limitations in charging batteries using a cable such as a distance limitation, having a cable with an adapter suitable for each device, and the like.

In an existing charging method via a wireless power transmission, a power transmitter is connected to a power supply via a cable and the power transmitter is fixed in position. As a result of this fixed position, wireless power transmission efficiency decreases as a distance from the transmitter increases. Also, wireless power transmission may not be effective for portable devices that have been miniaturized.

SUMMARY

In one general aspect, there is provided a method for transmitting power using a power transmission apparatus, the method comprising searching for a device to be charged located in an area by following a path, determining whether the found device should be charged when the device to be charged is found, and transmitting power to the found device when it is determined that the found device should be charged.

The searching for the device to be charged may comprise transmitting a search signal having a predetermined strength while traveling in a preset area, receiving a response signal from the device to be charged, and determining a strength of a response signal.

The searching for the device to be charged may comprise receiving position information about the device to be charged from a positioning device and controlling the power transmission apparatus to approach the device to be charged based on the position information.

The method may further comprise increasing a search count for the device, and searching for a next device to be charged when the increased search count is less than a preset count and a remaining charge capacity is greater than a minimum basic capacity.

The method may further comprise stopping the transmitting of the power to the device when receiving a charge termination signal from the device receiving the power, increasing a search count for the device, and searching for a next device to be charged when the increased search count is less than a preset count and a remaining charge capacity is greater than a minimum basic capacity.

In another aspect, there is provided a method of transmitting data using a power transmission apparatus, the method comprising receiving a data transmission request signal and a signal of identification (ID) information about at least one second device from a first device, transmitting an acknowledgement (ACK) signal to the first device, receiving data to be transmitted to the second device from the first device, searching for and finding the second device based on the ID information about the second device while traveling along a preset path, and transmitting the received data to the found second device.

The method may further comprise terminating data transmission and reception between the first device and the second device when the transmitting of the received data to the second device is completed.

In another aspect, there is provided a method of receiving power using a mobile device, the method comprising receiving a search signal for a device to be charged from a power transmission apparatus, determining whether to request charging when the received search signal satisfies a preset condition, receiving power from the power transmission apparatus when the charging is requested, and transmitting a charge termination signal to the power transmission apparatus when the charging is completed.

In another aspect, there is provided a power transmission apparatus, the apparatus comprising a device search unit configured to search for a device to be charged located in an area while the apparatus is following a path, a charge determination unit configured to determine whether the found device should be charged when the device is found, and a power transmission unit configured to transmit power to the found device when the found device is determined to be charged.

The device search unit may comprise a search signal transmission unit configured to transmit a search signal having a predetermined strength while traveling in a preset area, and a response signal determination unit configured to determine a strength of a response signal that is received in response to the search signal.

The device search unit may receive position information of the device from a positioning device and controls the power transmission apparatus to approach the device to be charged based on the position information.

The apparatus may further comprise a relay request receiving unit configured to receive, from a first device, a data transmission request signal and a signal of identification (ID) information about at least one second device, and an approval unit configured to transmit an ACK signal to the first device in response to receiving the data transmission request signal.

The apparatus may further comprise a relay processing unit configured to receive data to be transmitted to the at least one second device, from the first device, configured to search for the second device based on the ID information about the second device while traveling along a preset path, and configured to transmit the received data to the found second device.

The relay processing unit may receive data to be transmitted to the at least one second device from the first device and may simultaneously transmit the received data to the found second device.

The apparatus may further comprise a charging unit configured to be charged with power to be transmitted to the device.

A maximum power capacity charged in the charging unit may be greater than a sum of a maximum power capacity of each device and a minimum power capacity consumed in traveling for search in a preset area.

The charging unit may be charged with power provided from an external power supply.

The charging unit may comprise at least one of a long-distance charging unit, a short-distance charging unit, and a contact charging unit which are classified based on a charging distance from the external power supply, wherein the long-distance charging unit is charged within several meters, the short-distance charging unit is charged within several millimeters, and the contact charging unit is charged via a directly connected contact terminal.

The charging unit may comprise at least one of a cable charging unit and a wireless charging unit, and the cable charging unit is charged via a cable from the external power supply and the wireless charging unit is charged via a wireless power transmission device using resonance coupling or electromagnetic induction.

The charging unit may control the power transmission apparatus to automatically transfer to a charging location using an infrared sensor when a remaining charge capacity is less than a minimum basic remaining capacity.

The power transmission unit may comprise at least one of a long-distance transmission unit, a short-distance transmission unit, and a contact transmission unit which are classified based on a transmission distance from the device, wherein the long-distance transmission unit transmits power within several meters, the short-distance transmission unit transmits power within several millimeters, and the contact transmission unit transmits power via a directly connected contact terminal.

The device search unit may transmit a search signal in the same resonance frequency as at least one resonance frequency in order to search for each device, when a response signal in the at least one resonance frequency is received from the found device.

The power transmission unit may simultaneously transmit power to the at least one found device to be charged when a request for charging is received from the at least one found device.

The charging unit may receive power from an external wireless power device, and the power transmission unit may transmit the received power to the found device while the received power is being charged.

In another aspect, there is provided an apparatus for receiving power, the apparatus comprising a charge request determination unit configured to determine whether to request charging when a search signal received from a source satisfies a preset condition, a power receiving unit configured to receive power from the source when the charging is requested, and a charge termination transmission unit configured to transmit a charge termination signal to the source when the charging is completed.

In another aspect, there is provided a mobile power transmission apparatus, comprising a device search unit configured to transmit a search signal and to receive a response signal including position information about at least one found device, a motor configured to power the mobile power transmission apparatus to travel along a path towards the at least one found device based on the position information, and a power transmission unit configured transmit power to the at least one found device.

The mobile power transmission apparatus may further comprise a charge determination unit configured to determine whether the at least one found device needs to be charged based on the received response signal.

The power transmission unit may be configured to simultaneously transmit power to the at least one found device via a contact interface and via a wireless interface.

The power transmission unit may be configured to simultaneously transmit power to at least two found devices.

Other features and aspects will be apparent from the following detailed description, the drawings, and the claims.

Figure 1:
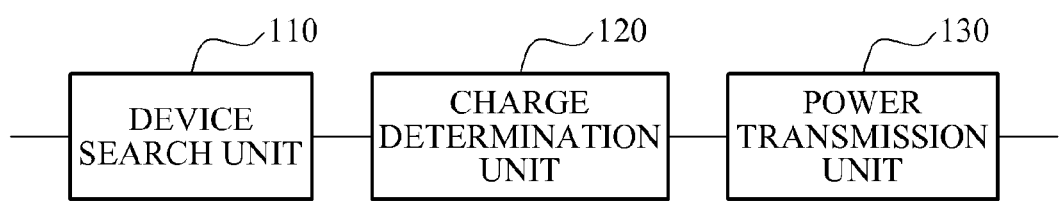
FIG. 1 is a diagram illustrating an example of a power transmission apparatus.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, description of well-known functions and constructions may be omitted for increased clarity and conciseness.

A power transmission technology is described herein. The power may be transmitted wirelessly and/or via a wired connection, in a contact connection such as a pad. For example, the wireless power transmission technology may be classified into three types, a method using electromagnetic induction, a method using reception of radio waves, and a method using an electric or magnetic resonance.

An example of wireless power transmission using electromagnetic induction includes a phenomenon in which two different coils become close to each other, allowing an alternating current to flow in one coil to generate a magnetic flux, and accordingly generate an electromotive force in the other coil. For example, the method using electromagnetic induction may have a power utilization efficiency of approximately 60 to 98%.

An example of wireless power transmission using reception of radio waves includes reception of radio wave energy via an antenna and obtaining power via conversion of an alternating radio wave form into a direct current through a rectifier circuit. The method using reception of radio waves may enable wireless power transmission over the longest distance from among the three examples of wireless power transmission technology described herein, for example, several meters or more.

An example of wireless power transmission using a resonance includes an electric or magnetic resonance and transmitting energy by devices resonating at the same frequency. When a magnetic resonance is used, power is generated through magnetic resonance coupling using a structure of an LC resonator. In this example, an LC resonator refers to a resonator configured as an inductor and a capacitor. The method using a magnetic resonance uses a non-radiative energy transmission unlike the method using reception of radio waves, and transmits power via a resonance frequency of a transmitter corresponding to a resonance frequency of a receiver. For example, use of the method using magnetic resonance enables power transmission efficiency may increase by approximately 50 to 60%, which is considerably higher than the method using reception of radio waves using radio wave radiation. For example, a distance between the transmitter and the receiver may be about several meters, and the method may be used within a short distance as compared with the method using reception of radio waves. Accordingly, the method may transmit power within a significantly longer distance as compared with the method using electromagnetic induction that may be used within several millimeters. Further, power is transmitted only to devices having the same resonance frequency as the transmitter, and thus, other neighbor devices and/or human bodies are rarely affected.

In the following examples, a transmitter to transmit power is referred to as a source, and a receiver to receive power is referred to as a device. That is, a mobile device transmitting power is a source, and electronic devices receiving power is a device. For example, the mobile device that transmits power may refer to a mobile object to transmit and receive power and data. The mobile device that transmits power may include a robot. The electronic devices or receivers may include various home appliances, for example, a digital media frame, a speaker, a vacuum cleaner, a hair dryer, and an electric razor, a notebook, a computer and peripherals, portable devices, such as a mobile phone, a digital camera, a camcorder, an MP3 player, and a PDA, a femtocell base station, various sensors and lighting apparatuses, and the like. In addition, a mobile device to relay data may also be referred to as a source, and a component to transmit and receive data through the source is referred to as a device.

FIG. 1 illustrates an example of a power transmission.

Referring to FIG. 1, the power transmission apparatus includes a device search unit 110, a charge determination unit 120, and a power transmission unit 130. The power transmission apparatus may be, or may be included in, a terminal such as a mobile device, a robot, a computer, and the like. As described herein, the power transmission apparatus may be a mobile device that has the capability of traveling in a direction towards or away from devices that need to be charged and/or devices that do not need to be charged.

The device search unit 110 may search for a device to be charged by following a path. For example, the device search unit 110 may search for a device located in an area by following the path. The device search unit 110 may transmit a search signal and may receive a response signal in response to the search signal. For example, the device search unit 110 may transmit/receive signals in a preset area for searching and traveling to search for a device to be charged. As an example, the search signal and the response signal may use the same resonance frequency. Further, the device search unit 110 may search for a device to be charged based on position information about each device located in the area. For example, the power transmission apparatus may not perform a random search but may instead travel along a predetermined route using position information about a device to be charged or multiple devices to be charged. By following a predetermined path, power consumption may decrease and the search may be performed more efficiently in comparison to a random search.

As another example, the device search unit 110 may receive position information about a device from a positioning device (not shown) and may control the power transmission apparatus to move to the preset area. For example, the positioning device may perform location recognition and may identify a location of a target using an infrared sensor, an ultrasonic signal, a radio frequency (RF) signal, a Wi-Fi signal, and the like. A fixed positioning device may identify a location of each device through various signals and may generate and update position information periodically within the preset area where the power transmission apparatus travels. As another example, a mobile positioning device may move in the preset area to search for a device to be charged. For example, the search may be performed using a transmission and response processes using a resonance frequency, an infrared sensor, an ultrasonic signal, an RF signal, and the like.

The positioning device may allocate identification (ID) information to a found device, may calculate position information about the found device, and may store the ID information and the position information. As another example, the positioning device may identify and store information about a remaining charge capacity of the found device. The positioning device may move again in the preset area and may search for another device to be charged and may store ID information and calculated position information of one or more additional found devices. When there are no devices to be found in the preset area, the positioning device may consume power by terminating traveling to collect position information.

The positioning device may be provided in the power transmission apparatus or may be an independent apparatus. The positioning device may already be aware of position information about a device to be found. Thus, the device search unit 110 may receive position information about a device to be charged from the positioning device and may control the mobile device to move to the device to be charged. For example, the device search unit 110 may identify the position information about the device to be charged from the positioning device to reduce unnecessary consumption of power and to control the power transmission apparatus to approach the device to be charged through an optimal path.

Further, the device search unit 110 may avoid nearby obstacles using a sensor such as an optical sensor or a proximity sensor. Thus, the device search unit 110 may control the power transmission apparatus to approach as close as possible to the device while at the same time avoiding would be obstacles that are in between the power transmission apparatus and the device to be charged.

The charge determination unit 120 may determine whether a found device needs charging. For example, the charge determination unit 120 may determine whether charging should be performed based on receiving a charge request signal from the device. Further, the source may transmit a query signal inquiring about whether there is a need to charge the device and may determine whether there is a need to charge the device based on a response signal to the query signal. Determining whether there is a need to charge may improve power transmission efficiency. For example, when the source discovers a device, by not transmitting power unconditionally and by transmitting power based on conditions of the device, power may be conserved. The conditions of the device may include, for example, a charging state, a capacity of a battery, an operation mode of the device, and the like. In some embodiments, the charge determination unit 120 may be omitted from the apparatus.

The power transmission unit 130 may transmit power to the found device when the device is determined to be charged. For example, a power transmission method may include at least one of a method of wireless power transmission using electromagnetic induction, radio waves, and a resonance, and a method of direct contact using a transmission contact terminal. The power transmission unit 130 may employ a single method of the above two methods or may selectively employ two or more methods, for example, based on a charging state of the source transmitting power, a transmission distance, a kind of a device, and the like.

In addition, the power transmission unit 130 may transmit power two or more devices at the same time when there are two or more devices that need to be charged and the two or more devices are located in a distance in which power transmission is possible.

It should also be appreciated that the power transmission apparatus may include a motor (not shown) for driving the apparatus and a steering mechanism (not shown) for steering the apparatus.

Figure 2:
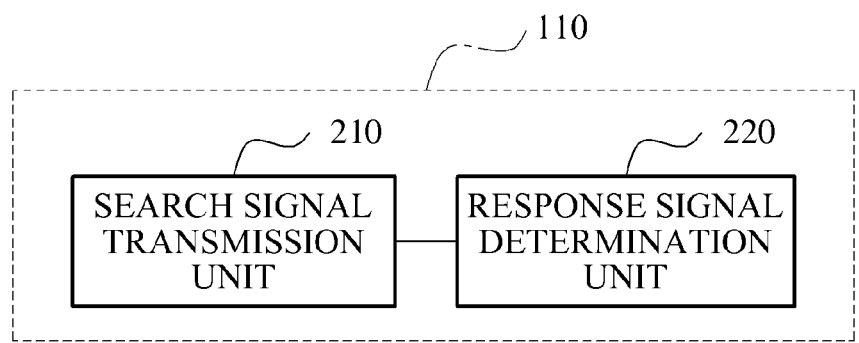
FIG. 2 is a diagram illustrating an example of a device search unit shown in FIG. 1.

FIG. 2 illustrates an example of the device search unit shown in FIG. 1.

Referring to FIG. 2, the device search unit 110 includes a search signal transmission unit 210 and a response signal determination unit 220.

The search signal transmission unit 210 may transmit a search signal having a predetermined strength and traveling along a preset path. The preset path refers to a preset path or preset area in which the power transmission apparatus travels and performs a search. For example, because the source is a mobile device, the source does not transmit a search signal while in a fixed position but may transmit a search signal while traveling along the preset path. When the search signal transmission unit 210 uses a wireless power transmission via a resonance, the search signal having the predetermined strength may be transmitted to neighbors via a resonance frequency. As another example, the search signal may be transmitted via a different frequency band instead of the resonance frequency. As another example, the search signal may be transmitted to a device to be charged using an infrared sensor, an ultrasonic signal, a Wi-Fi signal, and the like. One or more sensors may be attached to the search signal transmission unit 210 and the device and a signal exchange may be performed through a signal to be detected through the sensors, so that the device to be charged may be found.

The response signal determination unit 220 may determine a response signal that is received in response to a transmitted search signal. For example, the response signal determination unit 220 may determine that the response signal indicates that the device needs to be charged and is in response to the search signal transmitted from the search signal transmission unit 210. In wireless power transmission via a resonance, the search signal uses a resonance frequency of the source, and the device to be charged may cause a resonance phenomenon via the same resonance frequency. For example, because the source is a mobile device, the source may transmit and receive a signal in a state of being close to the device to be charged. For example, a strength of the response signal may be greater close to the device to be charged. The response signal determination unit 220 may determine a proper distance for charging the device to be charged, and may terminate the search, for example, when the strength of the signal is at a threshold value ρ or more.

The device to be charged may transmit a charge request signal to the source regardless of whether to transmit the search signal. For example, as the source moves close to the device to be charged, the strength of the charge request signal may become the threshold value ρ or more, and then a search for the device to be charged may be terminated.

Figure 3:
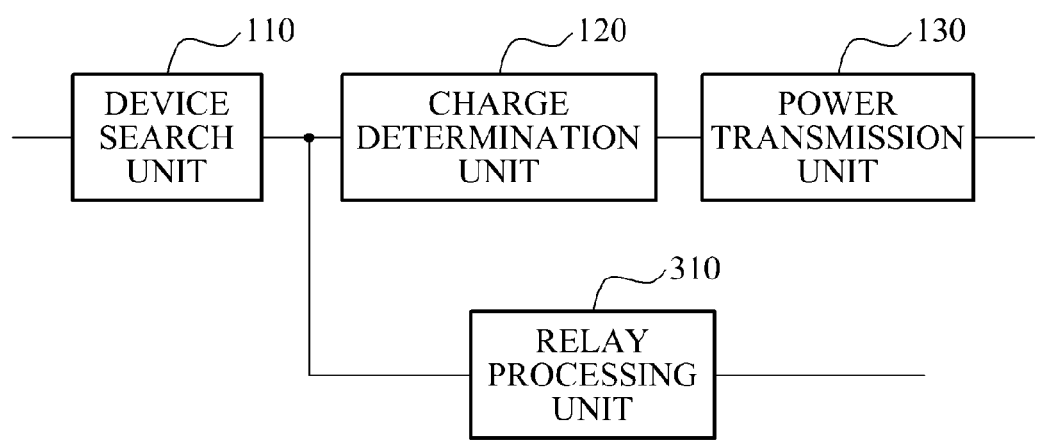
FIG. 3 is a diagram illustrating another example of a power transmission apparatus to perform data communication.

FIG. 3 illustrates another example of a power transmission apparatus to perform data communication.

Referring to FIG. 3, the power transmission apparatus may further include a relay processing unit 310 in addition to the components of the power transmission device shown in FIG. 1. The relay processing unit 310 may receive a data relay request from a device to be charged and may perform data transmission.

For example, the relay processing unit 310 may receive data to be transmitted to at least one second device from a first device, may search for the second device based on ID information about the second device traveling in a preset area, and may transmit the data transmitted from the first device to the found second device. For example, when the first device to transmit data to at least one device exists among the devices distributed in the preset area in which the power transmission apparatus searches for, the first device may use the power transmission apparatus.

For example, the first device may request a data relay to the power transmission apparatus and may transmit ID information about the at least one second device to receive data, for example, ID, position, and the like. The relay processing unit 310 may receive a relay request signal and may determine whether to approve the relay based on conditions of the power transmission apparatus, for example, a charging state, an order of priority of power transmission and data relay, efficiency according to a travelling distance, and the like. When the relay is determined, the relay processing unit 310 may receive the data to transmit from the first device. The received data may be stored in a data storage unit.

The relay processing unit 310 may include a relay request receiving unit to receive a data transmission request signal and a signal of the ID information about the at least one second device from the first device. The relay processing unit 310 may include an approval unit to transmit an acknowledgement (ACK) signal to approve the determination of the relay to the first device, in response to the data transmission request signal. For example, the relay processing unit 310 may receive a request for data transmission from the first device and may receive the data to transmit to the second device by transmitting an ACK signal to indicate reception of a request signal. The transmitted data may be stored in the data storage unit.

The relay processing unit 310 may search for the at least one second device to transmit the data when data is completely transmitted from the first device. For example, a search process may be performed using a resonance frequency, an infrared sensor, an ultrasonic sensor, and the like. The search process may be based on the ID information of the second device received from the first device, for example, ID, position, and the like. The relay processing unit 310 may search for the second device before the data is completely transmitted from the first device. However, because a distance for data transmission is limited, a distance for search may be limited through transmission efficiency such as a transmitted data packet.

The relay processing unit 310 may receive the data from the first device and transmit the received data to the second device at the same time. Because the relay processing unit 310 receives the data and transmits the received data to the second device at the same time, a capacity of a storage device used to store the data may be reduced.

The relay processing unit 310 may transmit the data received from the first device to the found at least one second device. For example, when there are two or more second devices to receive the data from the first device, the data may be transmitted to one second device, and then a device search may be repeated and the data may be transmitted. The relay processing unit 310 may transmit the data at the same time, when two or more devices to receive the data are in a position to enable reception of the data at the same time.

The relay processing unit 310 may also determine whether power transmission may be performed at the same time while transmitting and receiving data with the first device or the second device. For example, if there is a charge request from the first device or the second device, the relay processing unit 310 may perform data transmission and reception at the same time as charging. When there is no charge request, the relay processing unit 310 performs only data transmission and reception.

Figure 4:
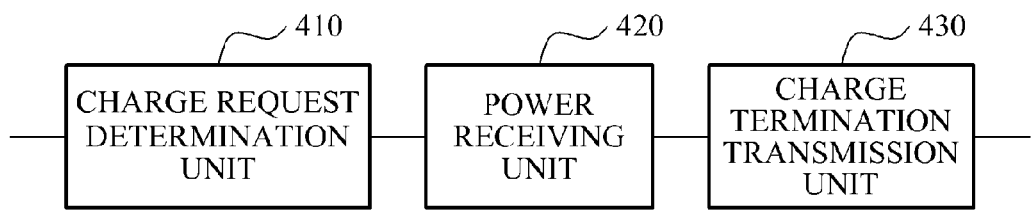
FIG. 4 is a diagram illustrating an example of a power receiving apparatus.

FIG. 4 illustrates an example of a power receiving apparatus.

Referring to FIG. 4, the power receiving apparatus includes a charge request determination unit 410, a power receiving unit 420, and a charge termination transmission unit 430.

The charge request determination unit 410 may determine whether to request charging when a search signal received from a source satisfies a preset condition. For example, the preset condition may correspond to an example where the strength of the search signal received from the source is a predetermined threshold value ρ or more. Because the source is a mobile device, the strength of the search signal received from the source may become greater as the source moves close to the charge request determination unit 410.

The charge request determination unit 410 may determine whether to request charging from the source based on conditions of the device, for example, a condition of a battery, capacity, and device schedule for use. For example, when the search signal uses a wireless power transmission using a resonance, the charge request determination unit 410 may determine whether to transmit a charge request signal via the same resonance frequency when an extent of the resonance frequency of the source is the predetermined threshold value ρ or more.

The power receiving unit 420 may receive power from the source when charging is requested. For example, when a signal to request charging such as an ACK signal is transmitted, the power receiving unit 420 may receive power for charging from the source.

The charge termination transmission unit 430 may transmit a charge termination signal to the source when charging is completed with power received from the source. For example, the charge termination transmission unit 430 may transmit the charge termination signal to the source to terminate power transmission from the source when the charging is completed.

Figure 5:
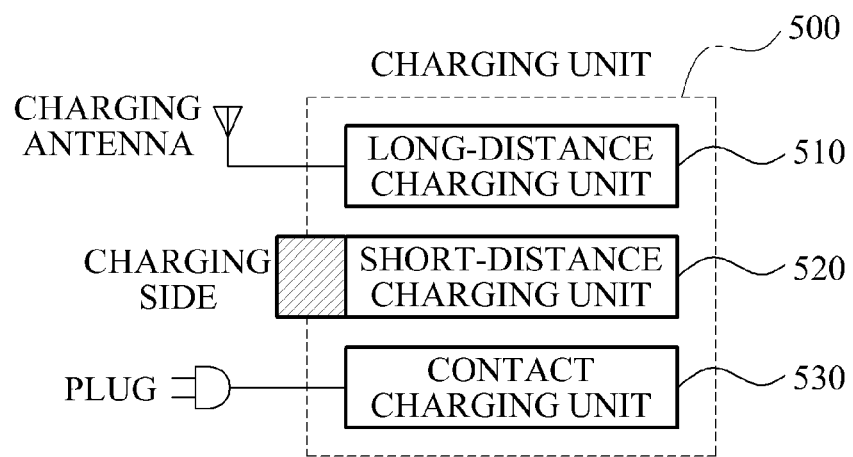
FIG. 5 is a diagram illustrating an example of a charging unit.

FIG. 5 illustrates an example of a charging unit.

Referring to FIG. 5, a power transmission apparatus may further include a charging unit 500 to be charged with power to be transmitted to a device. For example, the charging unit 500 may be supplied with power from an internal or external source for power transmission. Internally, power may be provided from a self-generator provided in the mobile device.

Provision of power from an external source may be classified based on a distance between the charging unit 500 and a power supply. To receive power from an external power supply, the charging unit 500 may include a long-distance charging unit 510, a short-distance charging unit 520, and a contact charging unit 530.

For example, the long-distance charging unit 510 may be charged when the distance between the charging unit 500 and the external power supply is large, for example, several meters or more. The long-distance charging unit 510 may be provided with power through a wireless power transmission, for example, via radio waves or a resonance using a charging antenna. Among resonances, when an LC resonator is used via a magnetic resonance, only devices that generate a resonance phenomenon through a resonance of a resonance frequency may be charged. Thus, power distribution efficiency is improved.

As another example, the short-distance charging unit 520 may be charged when the distance between the charging unit 500 and the external power supply is short, for example, within several millimeters. The short-distance charging unit 520 may use a wireless power transmission, for example, via electromagnetic induction, and thus power may be provided from the external power supply within several millimeters through a charging side.

The contact charging unit 530 may be charged, for example, through a plug in a cable power transmission. Thus, charging via a cable having the highest power transmission efficiency may be enabled when the charging unit 500 is within a distance to enable the charging via the cable from the external power supply.

The long-distance charging unit 510 and the short-distance charging unit 520 may be charged using a wireless signal instead of a cable and thus may be referred to as a wireless charging unit. The contact charging unit 530 may be charged using a cable and thus, may be referred to as a cable charging unit. The charging unit 500 may include any one of the long-distance charging unit 510, the short-distance charging unit 520, and the contact charging unit 530, or may include two or more of the long-distance charging unit 510, the short-distance charging unit 520, and the contact charging unit 530 in order to adaptively adjust charging based on a capacity of stored power in the charging unit 500, a distance from the external power supply, and the like.

The power transmission apparatus including the charging unit 500 may automatically transfer to a charging location using an infrared sensor, for example, when a remaining charge capacity is less than a minimum basic remaining capacity. The charging unit 500 may automatically transfer to the charging location using the infrared sensor, for example, by positioning a camera in a charging station and attaching the infrared sensor to an outside of the power transmission apparatus. For example, the power transmission apparatus may transfer to a charging location when a capacity of power stored in the power transmission apparatus is less than the minimum basic remaining capacity set based on a device in an area for search. For example, the minimum basic remaining capacity may be a sum of a basic power capacity consumed to search for a device in the closest position to a present position among devices to be charged, a basic power capacity consumed to move to the charging location, a maximum charging power capacity of the device in the closest position, and the like.

Figure 6:
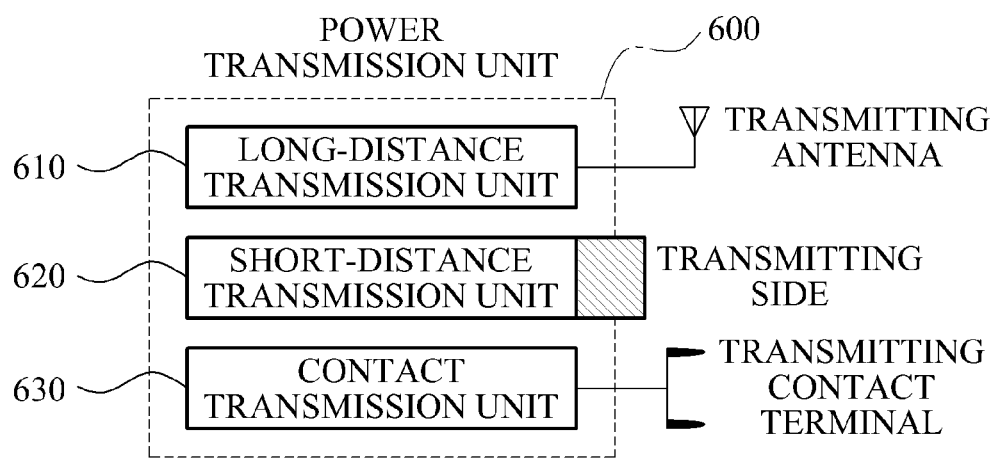
FIG. 6 is a diagram illustrating an example of a power transmission unit.

FIG. 6 illustrates an example of a power transmission unit.

Referring to FIG. 6, the power transmission unit 600 includes a long-distance power transmission unit 610, a short-distance power transmission unit 620, and a contact power transmission unit 630. For example, the power transmission unit 600 may be classified into a long-distance power transmitter, the short-distance power transmitter, and the contact power transmitter, based on a power transmission distance between the power transmission unit 600 and a device.

For example, the long-distance transmission unit 610 may transmit power within several meters, the short-distance transmission unit 620 may transmit power within several millimeters, and the contact transmission unit 630 may transmit power via a direct connection to a device through a contact terminal. For example, the long-distance power transmission unit 610 may transmit power through a wireless power transmission via radio waves or a resonance using a transmitting antenna. Among resonances, when an LC resonator is used via a magnetic resonance, power may be transmitted only to devices that generate a resonance phenomenon through a resonance of a resonance frequency. For example, the short-distance power transmission unit 620 may transmit power to a device within several millimeters through a transmitting side via a wireless power transmission using electromagnetic induction. For example, the contact transmission unit 630 may be directly connected to a device using a contact terminal to transmit power.

The power transmission unit 600 may include any one of the long-distance power transmission unit 610, the short-distance power transmission unit 620, and the contact power transmission unit 630, or may include two or more of the long-distance power transmission unit 610, the short-distance power transmission unit 620, and the contact power transmission unit 630 in order to adaptively adjust power transmission based on a transmitting distance, a transmitting scheme of a device, and the like. For example, when devices distributed in the preset area are several meters away from the source, a resonance may be used. When the source may be within several millimeters to devices, electromagnetic induction may be selected.

Figure 7:
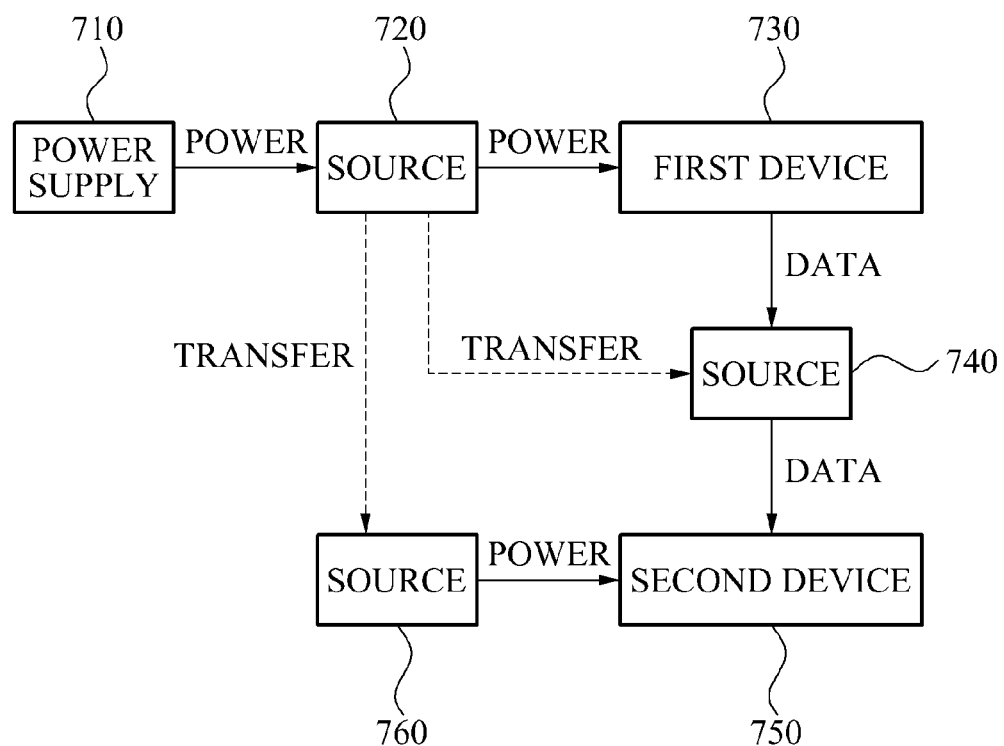
FIG. 7 is a diagram illustrating an example of a system to perform power transmission and data communication.

FIG. 7 illustrates an example of a system to perform power transmission and data communication.

Referring to FIG. 7, the system for power transmission and data transmission and reception includes a power supply 710, sources 720, 740, and 760, a first device 730, and a second device 750.

The sources 720, 740, and 760 may be mobile devices that transmit and receive power and/or that transmit and receive data. In this example, source 720 is provided with power from the power supply 710. For example, a charging unit of the source 720 may be provided with power from the external power supply 710 through a wireless power transmission via electromagnetic induction, radio waves or a resonance, and through a cable power transmission. The source 720 may search for a device to be charged and may transmit power when a charge request is received from the found device.

For example, the source 720 may discover the first device 730 through a search and may transmit power when the charge request is received from the first device 730. A power transmission unit responsible for power transmission of the source 720 may also provide power through a wireless power transmission via electromagnetic induction, radio waves or a resonance, and through a cable power transmission. In this example, the first device 730 may request the source 720 to relay data to the second device 750. When the source 740 accepts a data relay request, the first device 730 may transmit the data to the source 740, and the source 740 may search for the second device 750 and may transmit the transmitted data to the second device 750. When transmitting the data to the second device 750, the source 740 may receive a charge request from the second device 750. When charging is requested, the source 760 may transmit power to the second device 750 along with transmission of the data.

A frequency band used to transmit data may be the same as or different from a frequency band used to transmit and receive power. The system for data transmission and reception using the mobile device may use the source 740 to enable expansion of a data transmission and reception range, for example, when data transmission and reception limitations occur because devices are in fixed positions distant from each other, and the like. The system for data transmission and reception may transmit and receive data using the mobile source 740 even when devices travels in a preset area, thereby improving data transmission and reception efficiency.

The sources 720, 740, and 760 may receive data from the first device 730 at the same time as transmitting the data to the second device 750 (packet by packet). Accordingly, a real-time data relay is possible. When data transmission and reception is limited, a mobile source may be used to securely expand a data transmission and reception range. In addition, time involved in completely receiving all data by the second device 750 and a capacity in a storage unit to store the received data may be reduced.

In the above description, the sources 720, 740, and 760 may be the same mobile device and may be distinguished in functions based on power transmission or data transmission and reception.

When a remaining charge capacity is less than a minimum basic remaining capacity, the sources 720, 740, and 760 may automatically transfer to a charging location during power transmission or data transmission and reception with a device. For example, when the source 740 receives the data relay request from the first device, the source 740 may reject the data relay request based on a power capacity consumed for a data relay and a power capacity consumed to search for the second device 750.

The minimum basic remaining capacity may be preset based on a path of a source for a search and a minimum power capacity needed for a device to be found. For example, a method of an automatic transfer to a charging location may include transferring to a position of the charging location preset by a positioning device when charging is to be performed, identifying an infrared sensor point attached to an outside of a mobile device, detecting an infrared mark attached to the charging location using an infrared sensor attached to a mobile device, and the like.

The sources 720, 740, and 760 may use a wireless power transmission to search for a device, and may use at least one resonance frequency when a resonance is used. For example, each device may transmit a charge request signal using a plurality of resonance frequencies in addition to using a single resonance frequency. In this example, the sources 720, 740, and 760 may be configured to transmit a search signal using the same resonance frequency as a resonance frequency of each device in order to use a resonance phenomenon.

The sources 720, 740, and 760 may transmit a search signal and may move to transmit power only when a charge request signal is received from a device to be charged instead of searching for the device to be charged. In some examples, the sources 720, 740, and 760 may discover two or more devices to be charged and may charge the found two or more devices at the same time.

In this example, the sources 720, 740, and 760 may be provided with power from the power supply 710 through a wireless power transmission while transmitting power to a found device. That is, the sources 720, 740, and 760 may also relay power. When power transmission and reception is limited, a mobile source may be used to effectively expand a power transmission and reception range. In addition, due to a process of being provided with power simultaneously with transmitting power, time in which a source is completely charged may be reduced.

Figure 8:
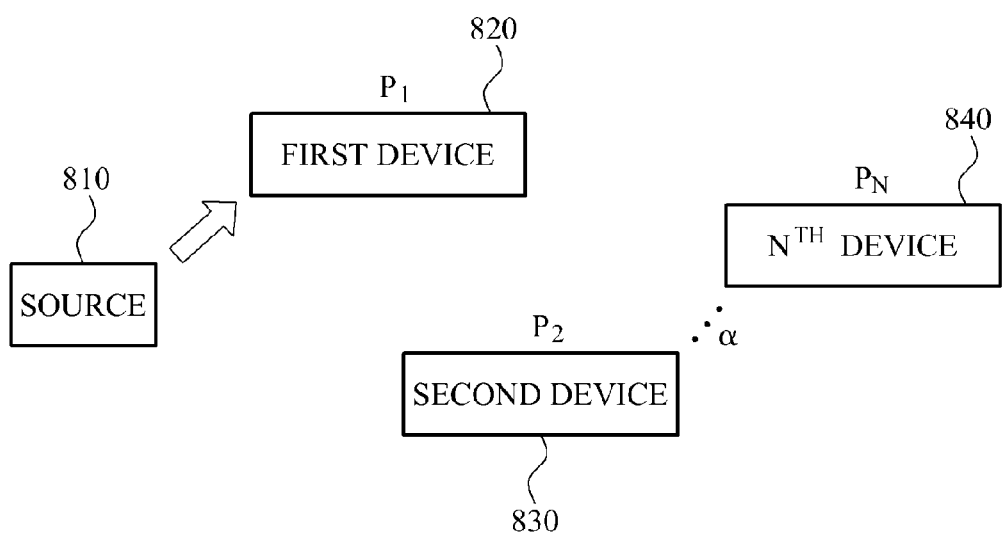
FIG. 8 is a diagram illustrating an example of a charge capacity of a power transmission device.

FIG. 8 illustrates an example of a charge capacity of a power transmission device using a mobile device.

Referring to FIG. 8, source 810 transmits power to N devices. For example, the source 810 may have a minimum power capacity for charging which may be a sum of a maximum power capacity of each device and a minimum power capacity consumed in traveling for search in a preset area. For example, the source 810 may be charged with a sum or more of a minimum power capacity a of the source 810 consumed in traveling and a maximum power capacity $P_1$ of a first device 820, a maximum power capacity $P_2$ of a second device 830, ..., a maximum power capacity $P_N$ of an $N^{th}$ device 840, that is, $P \geq P_1 + P_2 + P_3 + \ldots + P_N + \alpha$. When a case occurs that does not satisfy the above equation, the source 810 may automatically be recharged.

Figure 9:
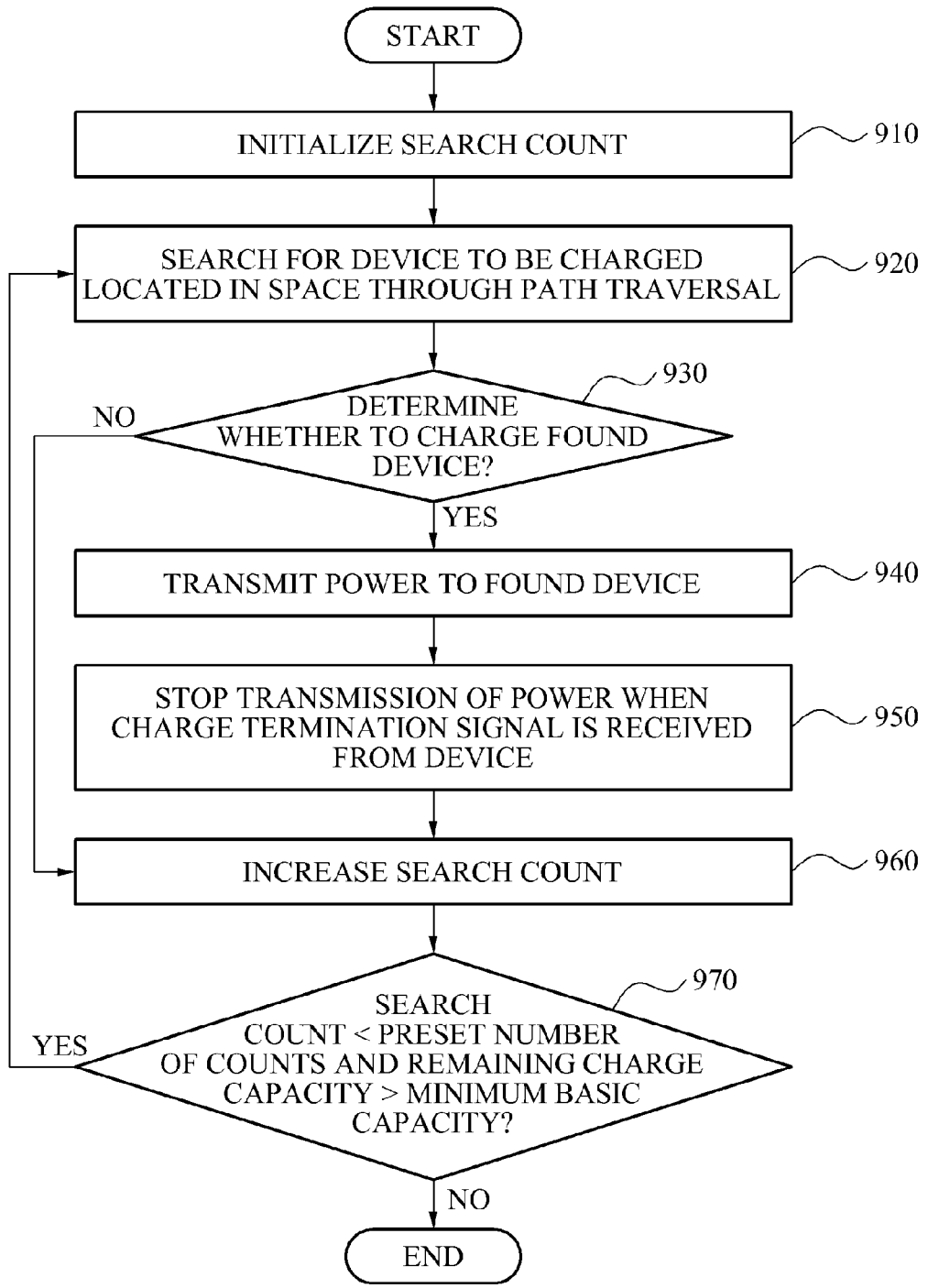
FIG. 9 is a flowchart illustrating an example of a method of transmitting power.

FIG. 9 illustrates an example of a method of transmitting power using a mobile device. For example, the method shown in FIG. 9 may be performed by the power transmission apparatus in FIG. 1.

Referring to FIG. 9, in 910, the source initializes a search count for a device to be charged. When the source searches for a device to be charged, a search may not be performed limitlessly. Thus, when there are N devices to be charged, N may be set as a maximum search count. As another example, an optional maximum search count may be set. Therefore, when the source starts to search for a device to be charged, the source initializes a search count.

In 920, the source searches for a device to be charged. For example, the source may transmit a search signal in a preset area for search and may receive a response signal responding to the search signal from a device that desires to be charged. For example, the search signal and the response signal may use the same resonance frequency. The searching for the device to be charged may use position information about each device located in the area. Accordingly, the power transmission apparatus does not perform a search at random but may travel along a predetermined route using position information about the device for search, so that power consumption decreases and search is performed efficiently.

In 930, the source determines whether to charge the device to be charged. Whether the found device needs to be charged may be based on receiving a charge request signal from the found device. For example, the source may transmit a query signal asking whether there is a need to charge the device and may determine whether there is a need to charge based on a response signal to the query signal. The determining of whether there is a need to charge may be used to improve power transmission efficiency by not transmitting power unconditionally but transmitting based on conditions of the device when the source discovers the device to be charged.

In 940, the source transmits power to the found device when the device requests charging. For example, the power transmission method may include a wireless power transmission using electromagnetic induction, radio waves, and a resonance, and the like. Power transmission may also include a direct contact method using a transmission contact terminal. The power transmission method may employ a single method of the above two methods or may selectively employ two or more methods, for example, based on a charging state of the source transmitting power, a transmission distance, a kind of a device, and the like.

In 950, the source stops transmitting power when a charge termination signal is received from the device receiving power.

In 960, the source increases a search count when the found device does not transmit a charge request signal or charging is completed. When the found device does not request charging, the source does not need to transmit power and thus increases the search count to determine whether to continue a next search. When charging is completed so that power transmission is stopped, the source may increase the search count to determine whether to continue a next search.

In 970, when the search count is less than a preset count and a remaining charge capacity is greater than a minimum basic capacity, the source searches again for a device to be charged. Otherwise, the source terminates a power transmission process.

As described in the examples herein, because a search is not performed continuously, the source continually determines whether to perform a search based on the search count and the remaining charge capacity of the source. When the increase search count is greater than the preset count or the remaining charge capacity is less than the minimum basic capacity, the search is terminated. When search is terminated, the power transmission process using the mobile device is also terminated. When the preset count is N which is a number of devices to be found, search is repeated N times. Thus, power is not wasted or consumed by unnecessarily searching for more devices after the source completely charges all devices.

The source may approach the found device while transmitting power to the device. That is, the source may be mobile, and may travel in a path towards the receiver, for example, in a direct path to the receiver. When a power transmission uses a resonance, transmission efficiency is improved within several meters and further increases with a closer distance. For example, in an LC resonance structure, when a distance between coils is 2 m, transmission efficiency may be about 45%. When the distance is 1 m, the transmission efficiency may be about 90%. After power transmission starts, the source may avoid adjacent obstacles using position information that may be received via a sensor and/or a positioning device and the source may move to the device as close as possible while avoiding adjacent obstacles.

Figure 10:
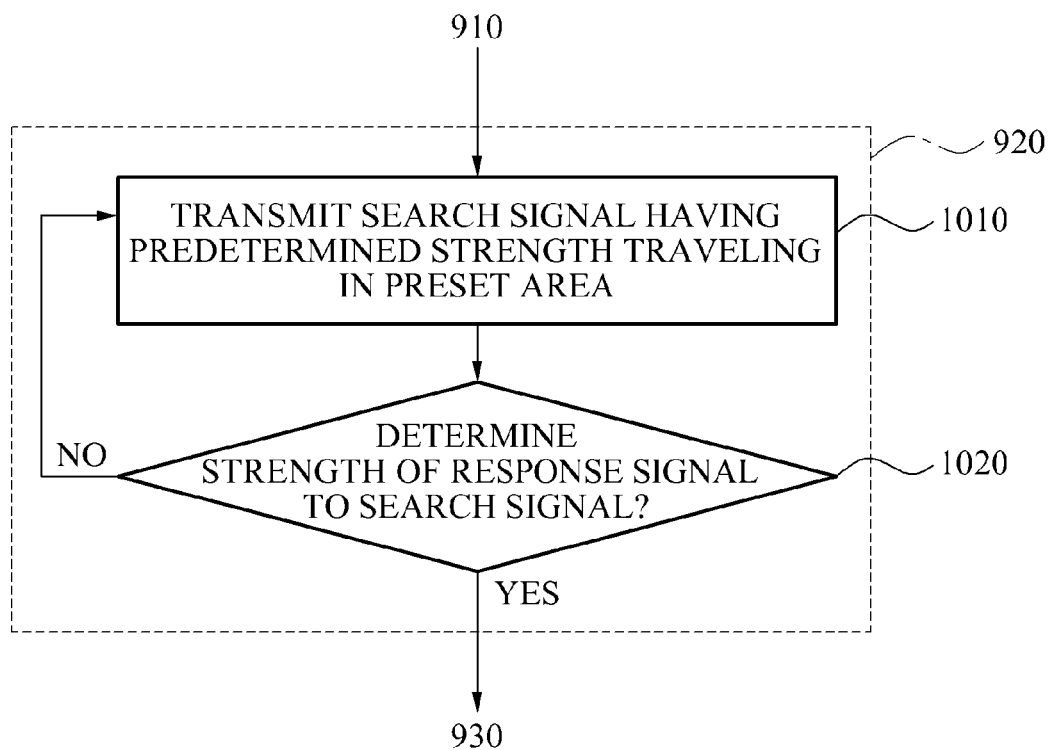
FIG. 10 is a flowchart illustrating an example of a process of searching for a device to be charged in FIG. 9.

FIG. 10 illustrates an example of a process of searching for a device to be charged in FIG. 9. For example, the process shown in FIG. 10 may be performed by the power transmission apparatus in FIG. 1.

In 1010, the source transmits a search signal having a predetermined strength, traveling in the preset area. Because the source may be a mobile device, the source does not transmit the search signal while in a fixed position but may transmit the search signal while traveling in the preset area. When the source uses a wireless power transmission via a resonance, the search signal having the predetermined strength may be transmitted to neighbors via a resonance frequency. As another example, the search signal may be transmitted via a different frequency band instead of the resonance frequency. As another example, the search signal may be transmitted to a device to be charged using an infrared sensor, an ultrasonic signal, a Wi-Fi signal, and the like.

In 1020, the source may determine a response signal in response to the search signal has been received from the device to be charged. In wireless power transmission via a resonance, the search signal may use a resonance frequency of the source and the device to be charged may cause a resonance phenomenon via the same resonance frequency. Because the source is a mobile device, the source may move closer to the device to be charged. A strength of the response signal may become greater as the source gets closer to the device to be charged, and the source may determine a proper distance for charging the device to be charged and terminate search, for example, when the strength of the signal is a predetermined threshold value ρ or more. By terminating the search, power may be conserved.

Figure 11:
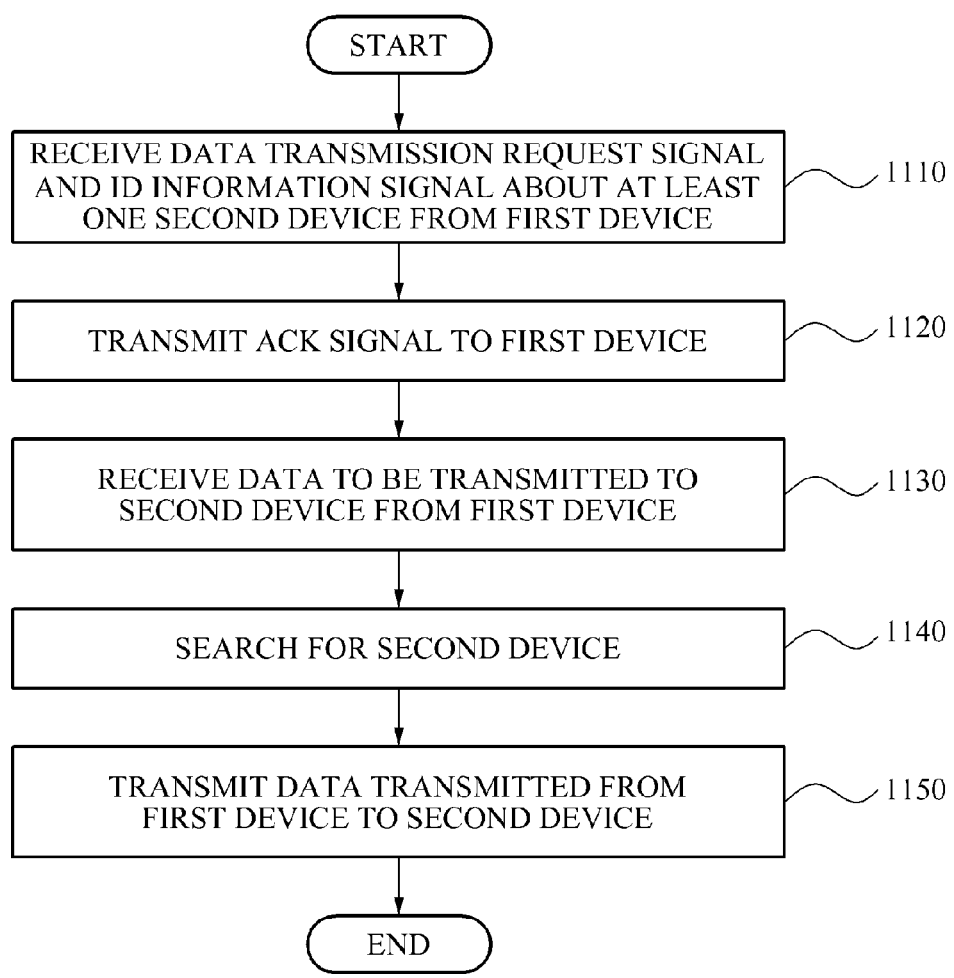
FIG. 11 is a flowchart illustrating an example of a data communication method.

FIG. 11 illustrates an example of a data communication method using a mobile device.

In FIG. 11, a source may transmit power to a device to be charged through a search, and also receive a relay request from the device and transmit data to another device.

In 1110, the source receives a data transmission request signal and a signal of ID information about at least one second device from a first device. The first device may request the source to transmit data to the second device. The source receives the data transmission request signal and the ID information about the at least one second device, for example, the signal of the ID information, from the first device In 1120, the source transmits an ACK signal to the first device. The source receiving the request for data transmission may transmit an ACK signal indicating that data transmission to the second device is possible to the first device. The first device may receive the ACK signal from the source and transmits data to the source.

In 1130, the source receives, from the first device, the data to be transmitted to the second device. The source receives, from the first device, the data transmitted to the second device and may store the data in a data storage unit.

In 1140, the source searches for the second device. The source receiving the data from the first device searches for the second device. In this example, a search method may be the same as a search method of the device to be charged which is transmitting a search signal and receiving a response signal to the search signal to search for the device to be charged. For example, because the ID information of the second device is identified, the second device may be found via authentication of ID or the like. For example, the search signal and the response signal may use the same resonance frequency. As another example, the search method of the device to be charged may be use position information of each device located in an area. The source may search for the second device when the data is completely received, or search for the second device while the data is being received.

In 1150, the source transmits the transmitted data to the second device. The source transmits the data to a found second device. For example, the source may receive the data from the first device at the same time as searching for the second device, and may transmit the data to the second device when data transmission is possible.

The source may stop data transmission and reception when the data is completely transmitted to the second device. The source may start a search again when another device which the data is transmitted to exists.

When interference substantially affects neighbor devices in data communication, the source may perform data communication between devices along with a wireless power transmission to decrease influence of the interference. The data communication between devices may refer to, for example, transmission of image information in a digital camera to a distant digital media frame or transmission of information in one sensor to another distant sensor or a processing device to process the information.

Figure 12:
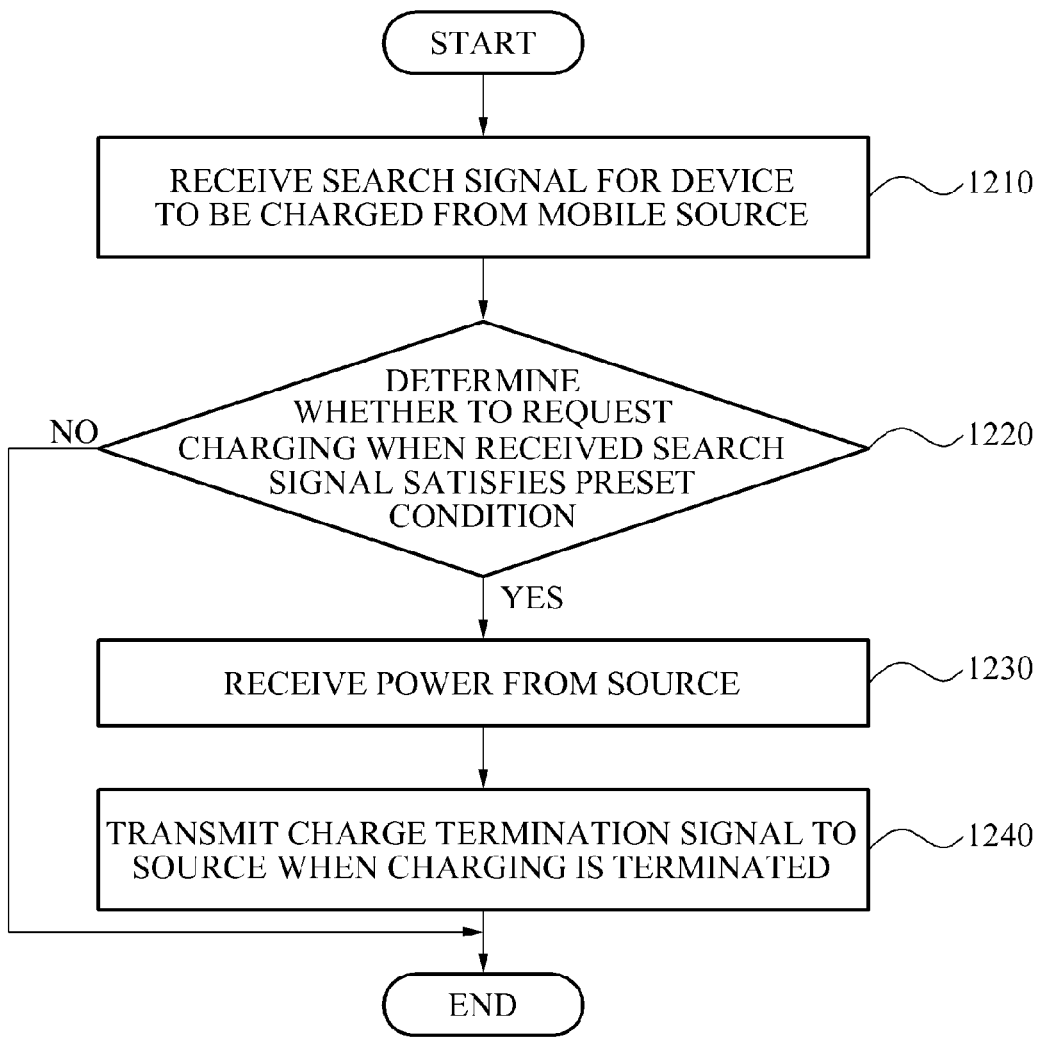
FIG. 12 is a flowchart illustrating an example of a power receiving method.

FIG. 12 illustrates an example of a power receiving method. For example, the method shown in FIG. 12 may be performed by the power receiving apparatus in FIG. 4.

In 1210, the device receives a search signal for a device to be charged from a source. For example, the search signal for the device to be charged may be a resonance frequency when using a resonance, a communication protocol using a frequency other than the resonance frequency, an RF signal, and the like.

In 1220, the device determines whether to request charging when the received search signal satisfies a preset condition. The preset condition may mean that a strength of the search signal received from the source is a predetermined threshold value ρ or more. For example, because the source is a mobile device, the strength of the search signal received from the source may become greater as the source moves close to the device. The device may determine whether to request charging from the source based on conditions of the device, for example, a condition of a battery, capacity, and device schedule for use. For example, when the search signal uses a wireless power transmission using a resonance, the device may determine whether to transmit a charge request signal via the same resonance frequency when an extent of the resonance frequency of the source is the predetermined threshold value ρ or more.

In 1230, the device receives power from the source when charging is requested. When a signal to request charging, such as an ACK signal, is transmitted, the device receives power for charging from the source.

In 1240, the device transmits a charge termination signal to the source when charging is completed. The device transmits the charge termination signal to the source to terminate power transmission from the source when the charging is completed.

Described herein are examples of a power transmission apparatus and method. The apparatus may be mobile and may travel towards or away from various devices, for example, based on whether the devices need to be charged. Accordingly, the power transmission apparatus may include a motor or other power source that powers the apparatus to move. The apparatus may also include an automatic steering mechanism that allows the apparatus to move in a desired direction without running into obstacles. For example, the apparatus may include one or more sensors that are configured to detect a location of the apparatus and a location of one or more devices to be charged. Also, the one or more sensors may detect various obstacles on a path between the apparatus and the one or more devices to be found.

Accordingly, using the steering mechanism in combination with the motor and the one or more sensors, the apparatus can move around on a path towards the one or more devices to be found, without running into various obstacles.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and non-transitory computer-readable codes or program instructions may be stored and executed in a decentralized manner.

As a non-exhaustive illustration only, the terminal device described herein may refer to mobile devices such as a cellular phone, a personal digital assistant (PDA), a digital camera, a portable game console, an MP3 player, a portable/personal multimedia player (PMP), a handheld e-book, a portable labtop personal computer (PC), a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method for transmitting power using a power transmission apparatus, the method comprising:
   searching for a device to be charged located in an area while the power transmission apparatus moves along a path;
   determining whether the found device should be charged in response to finding the device to be charged; and
   transmitting power to the found device in response to determining that the found device should be charged.

2. The method of claim 1, wherein the searching for the device to be charged comprises:
   transmitting a search signal having a predetermined strength while the power transmission apparatus physically travels in a preset area;
   receiving a response signal from the device to be charged; and
   determining a strength of a response signal.

3. The method of claim 1, wherein the searching for the device to be charged comprises receiving position information about the device to be charged from a positioning device and controlling the power transmission apparatus to approach the device to be charged based on the position information.

4. The method of claim 1, further comprising:
   increasing a search count for the device; and
   searching for a next device to be charged in response to the increased search count being less than a preset count and a remaining charge capacity being greater than a minimum basic capacity.

5. The method of claim 1, further comprising:
   stopping the transmitting of the power to the device in response to receiving a charge termination signal from the device receiving the power;
   increasing a search count for the device; and
   searching for a next device to be charged in response to the increased search count being less than a preset count and a remaining charge capacity being greater than a minimum basic capacity.

6. A method of transmitting data using a power transmission apparatus, the method comprising:
   receiving a data transmission request signal and a signal of identification (ID) information about at least one second device from a first device;
   transmitting an acknowledgement (ACK) signal to the first device;
   receiving data to be transmitted to the second device from the first device;
   searching for and finding the second device based on the ID information about the second device while the power transmission apparatus travels along a preset path; and
   transmitting the received data to the found second device.

7. The method of claim 6, further comprising terminating data transmission and reception between the first device and the second device in response to the transmitting of the received data to the second device being completed.

8. A method of receiving power using a mobile device, the method comprising:
   receiving a search signal for a device to be charged from a power transmission apparatus;
   determining whether the mobile device should request charging in response to the received search signal satisfying a preset condition;
   receiving power from the power transmission apparatus in response to the charging being requested; and
   transmitting a charge termination signal to the power transmission apparatus in response to the charging is completed.

9. A power transmission apparatus, the apparatus comprising:
   a device search unit configured to search for a device to be charged located in an area while the apparatus travels along a path;
   a charge determination unit configured to determine whether the found device should be charged in response to the device being found; and
   a power transmission unit configured to transmit power to the found device in response to determining the found device should be charged.

10. The apparatus of claim 9, wherein the device search unit comprises:

a search signal transmission unit configured to transmit a search signal having a predetermined strength while the apparatus travels in a preset area; and a response signal determination unit configured to determine a strength of a response signal that is received in response to the search signal.

11. The apparatus of claim 9, wherein the device search unit receives position information of the device from a positioning device and controls the power transmission apparatus to approach the device to be charged based on the position information.

12. The apparatus of claim 9, further comprising
a relay request receiving unit configured to receive, from a first device, a data transmission request signal and a signal of identification (ID) information about at least one second device; and
an approval unit configured to transmit an ACK signal to the first device in response to receiving the data transmission request signal.

13. The apparatus of claim 12, further comprising a relay processing unit configured to receive data to be transmitted to the at least one second device, from the first device, configured to search for the second device based on the ID information about the second device while the apparatus travels along a preset path, and configured to transmit the received data to the found second device.

14. The apparatus of claim 13, wherein the relay processing unit receives data to be transmitted to the at least one second device from the first device and simultaneously transmits the received data to the found second device.

15. The apparatus of claim 9, further comprising a charging unit configured to be charged with power to be transmitted to the device.

16. The apparatus of claim 15, wherein a maximum power capacity charged in the charging unit is greater than a sum of a maximum power capacity of each device and a minimum power capacity consumed in traveling for search in a preset area.

17. The apparatus of claim 15, wherein the charging unit is charged with power provided from an external power supply.

18. The apparatus of claim 17, wherein the charging unit comprises at least one of a long-distance charging unit, a short-distance charging unit, and a contact charging unit which are classified based on a charging distance from the external power supply,
wherein the long-distance charging unit is charged within several meters, the short-distance charging unit is charged within several millimeters, and the contact charging unit is charged via a directly connected contact terminal.

19. The apparatus of claim 17, wherein the charging unit comprises at least one of a cable charging unit and a wireless charging unit, and the cable charging unit is charged via a cable from the external power supply and the wireless charging unit is charged via a wireless power transmission device using resonance coupling or electromagnetic induction.

20. The apparatus of claim 17, wherein the charging unit controls the power transmission apparatus to automatically move to a charging location using an infrared sensor in response to a remaining charge capacity of the power transmission apparatus being less than a minimum basic remaining capacity.

21. The apparatus of claim 9, wherein the power transmission unit comprises at least one of a long-distance transmission unit, a short-distance transmission unit, and a contact transmission unit which are classified based on a transmission distance from the device,
wherein the long-distance transmission unit transmits power within several meters, the short-distance transmission unit transmits power within several millimeters, and the contact transmission unit transmits power via a directly connected contact terminal.

22. The apparatus of claim 9, wherein the device search unit transmits a search signal in the same resonance frequency as at least one resonance frequency in order to search for each device, in response to a response signal in the at least one resonance frequency is received from the found device.

23. The apparatus of claim 9, wherein the power transmission unit transmits power to the at least one found device to be charged in response to a request for charging being received from the at least one found device.

24. The apparatus of claim 15, wherein the charging unit receives power from an external wireless power device, and the power transmission unit transmits the received power to the found device while the received power is being charged.

25. An apparatus for receiving power, the apparatus comprising:
a charge request determination unit configured to determine whether to request charging in response to a search signal received from a source satisfying a preset condition;
a power receiving unit configured to receive power from the source in response to the charging being requested; and
a charge termination transmission unit configured to transmit a charge termination signal to the source in response to the charging being completed.

26. A mobile power transmission apparatus, comprising:
a device search unit configured to transmit a search signal and to receive a response signal including position information about at least one found device;
a motor configured to power the mobile power transmission apparatus to travel along a path towards the at least one found device based on the position information; and
a power transmission unit configured transmit power to the at least one found device.

27. The mobile power transmission apparatus of claim 26, further comprising a charge determination unit configured to determine whether the at least one found device needs to be charged based on the received response signal.

28. The mobile power transmission apparatus of claim 26, wherein the power transmission unit is configured to simultaneously transmit power to the at least one found device via a contact interface and via a wireless interface.

29. The mobile power transmission apparatus of claim 26, wherein the power transmission unit is configured to simultaneously transmit power to at least two found devices.

* * * * *